(12) United States Patent
Liu et al.

(10) Patent No.: US 9,409,331 B2
(45) Date of Patent: Aug. 9, 2016

(54) ELECTRICAL CONNECTOR WITH AN IMPROVED TERMINAL BASE

(71) Applicant: FOXCONN INTERCONNECT TECHNOLOGY LIMITED, Grand Cayman (KY)

(72) Inventors: Xing-Liang Liu, Shenzhen (CN); Hong-Jing Luo, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/583,748

(22) Filed: Dec. 28, 2014

(65) Prior Publication Data

US 2015/0188250 A1   Jul. 2, 2015

(30) Foreign Application Priority Data

Dec. 27, 2013 (CN) ...................... 2013 2 0871682 U

(51) Int. Cl.

| B29C 45/14 | (2006.01) |
| H01R 12/72 | (2011.01) |
| H01R 13/504 | (2006.01) |
| B29C 45/16 | (2006.01) |
| H01R 24/60 | (2011.01) |
| B29L 31/36 | (2006.01) |
| H01R 13/6599 | (2011.01) |
| H01R 31/08 | (2006.01) |

(52) U.S. Cl.
CPC ....... *B29C 45/14639* (2013.01); *B29C 45/1671* (2013.01); *H01R 12/725* (2013.01); *H01R 13/504* (2013.01); *B29C 2045/1673* (2013.01); *B29L 2031/36* (2013.01); *H01R 13/6599* (2013.01); *H01R 24/60* (2013.01); *H01R 31/08* (2013.01)

(58) Field of Classification Search
USPC .............. 439/86, 76.1; 29/882, 849; 264/232, 264/104, 40.5
See application file for complete search history.

(56) References Cited

U.S. PATENT DOCUMENTS

| 4,737,116 A | * | 4/1988 | Slye et al. ........................ 439/92 |
| 5,178,549 A | * | 1/1993 | Neumann et al. ................ 439/74 |
| 5,882,227 A | * | 3/1999 | Neidich ..................... 439/607.1 |
| 6,709,294 B1 | * | 3/2004 | Cohen et al. ............. 439/607.07 |
| 6,832,934 B1 | * | 12/2004 | Zhang ........................... 439/660 |
| 7,485,009 B1 | * | 2/2009 | Zhu ............................... 439/660 |
| 7,795,714 B2 | * | 9/2010 | Hiew et al. ..................... 257/679 |

(Continued)

FOREIGN PATENT DOCUMENTS

CN        202585857 U     12/2012

*Primary Examiner* — Alexander Gilman
(74) *Attorney, Agent, or Firm* — Wei Te Chung; Ming Chieh Chang

(57) ABSTRACT

An electrical connector includes a terminal base and plurality conductive contacts, and the conductive contacts defining a first group of contacts, and the first group of contacts including several signal contacts and several grounding contacts arranged with the signal contacts at intervals. The terminal base includes an insulative housing, and a conductive plastic block integrally molded with the insulative housing and combining with the insulative housing seamlessly, the conductive plastic block electrically contacts with the grounding contacts to electrically connect the grounding contacts together. Therefore, the seamless state prevents any loose from the conductive plastic block and the insulative one, which could make the terminal base to be steadier.

17 Claims, 9 Drawing Sheets

(56) References Cited

U.S. PATENT DOCUMENTS

| | | |
|---|---|---|
| 7,909,652 B2* | 3/2011 | Yang et al. .................... 439/660 |
| 8,177,564 B1* | 5/2012 | Ito et al. ........................ 439/108 |
| 8,342,886 B2* | 1/2013 | Zhang et al. .................. 439/660 |
| 8,523,583 B2* | 9/2013 | Ito ................................. 439/108 |
| 8,585,440 B2* | 11/2013 | Jiang et al. .................... 439/626 |
| 8,926,342 B2* | 1/2015 | Vinther et al. .................. 439/79 |
| 9,077,118 B2* | 7/2015 | Szu et al. |
| 2012/0077389 A1* | 3/2012 | Zhang et al. .................. 439/660 |
| 2012/0108109 A1* | 5/2012 | Zhang et al. .................. 439/629 |

* cited by examiner

ELECTRICAL CONNECTOR WITH AN IMPROVED TERMINAL BASE

BACKGROUND OF THE INVENTION

1. Field of the Invention

The present invention relates to an electrical connector, more particularly to an electrical connector with an improved terminal base.

2. Description of Related Art

China Patent application No. 201120575876.0, published on Dec. 5, 2012, discloses a high transmission rate electrical connector, and the electrical connector has an insulative housing, a plurality of contacts and at least two conductive plastic blocks. The insulative housing defines at least a groove in it's tongue plate, and the contacts defines a first group of signal contacts, a second group of signal contacts and a third group of power contacts. Every group of contacts includes positive contacts and negative contacts, and every contact has a contact portion. The contact portions of the first group of signal contacts are retained above the groove, and a space is formed from the insulative housing and the contact portions. The conductive plastic blocks connect with the negative contacts of the first and the second group of signal contacts respectively. Therefore, the first group of signal contacts could improve the electrical properties by a better contact between the contact portion and the air, which could improve the transmission rate of the first group of signal contacts. And meanwhile the conductive plastic block shields the signal contacts which could reduce the interference between adjacent signal contacts, and it could improve the transmission rate of the first group of signal contacts higher. However it may be loosened when the conductive plastic blocks are assembled in the insulative housing.

BRIEF SUMMARY OF THE INVENTION

An object of the present invention is to provide an electrical connector which could keep the terminal base steady.

In order to achieve the above-mentioned object, an electrical connector includes terminal base and a plurality of conductive contacts. The conductive contacts define a first group of contacts, and the first group of contacts includes several signal contacts and several grounding contacts. The terminal base includes an insulative housing and a conductive plastic block integrally molded with the insulative housing and combining with the insulative housing seamlessly, and the conductive plastic block electrically contacts with the grounding contacts to electrically connect the grounding contacts together.

Therefore, it can prevent any loose from the conductive plastic block and the insulative housing, which could make the terminal base to be steadier.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
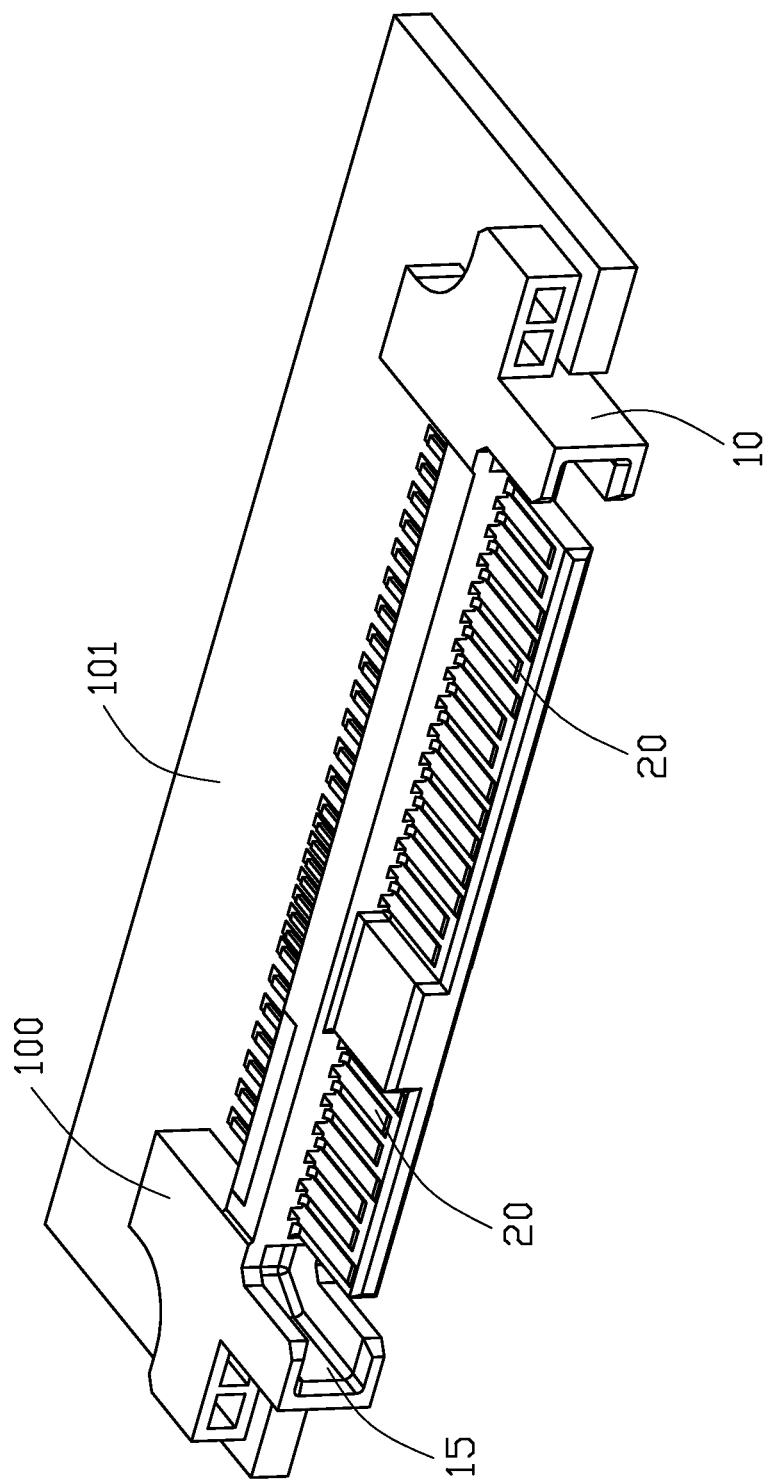
FIG. 1 is a perspective view of an electrical connector mounting in an electrical card according to an aspect of the present invention.

Reference will be made to the drawing figures to describe the present invention in detail, wherein depicted elements are not necessarily shown to scale and wherein like or similar elements are designated by same or similar reference numeral through the several views and same or similar terminology.

Figure 2:
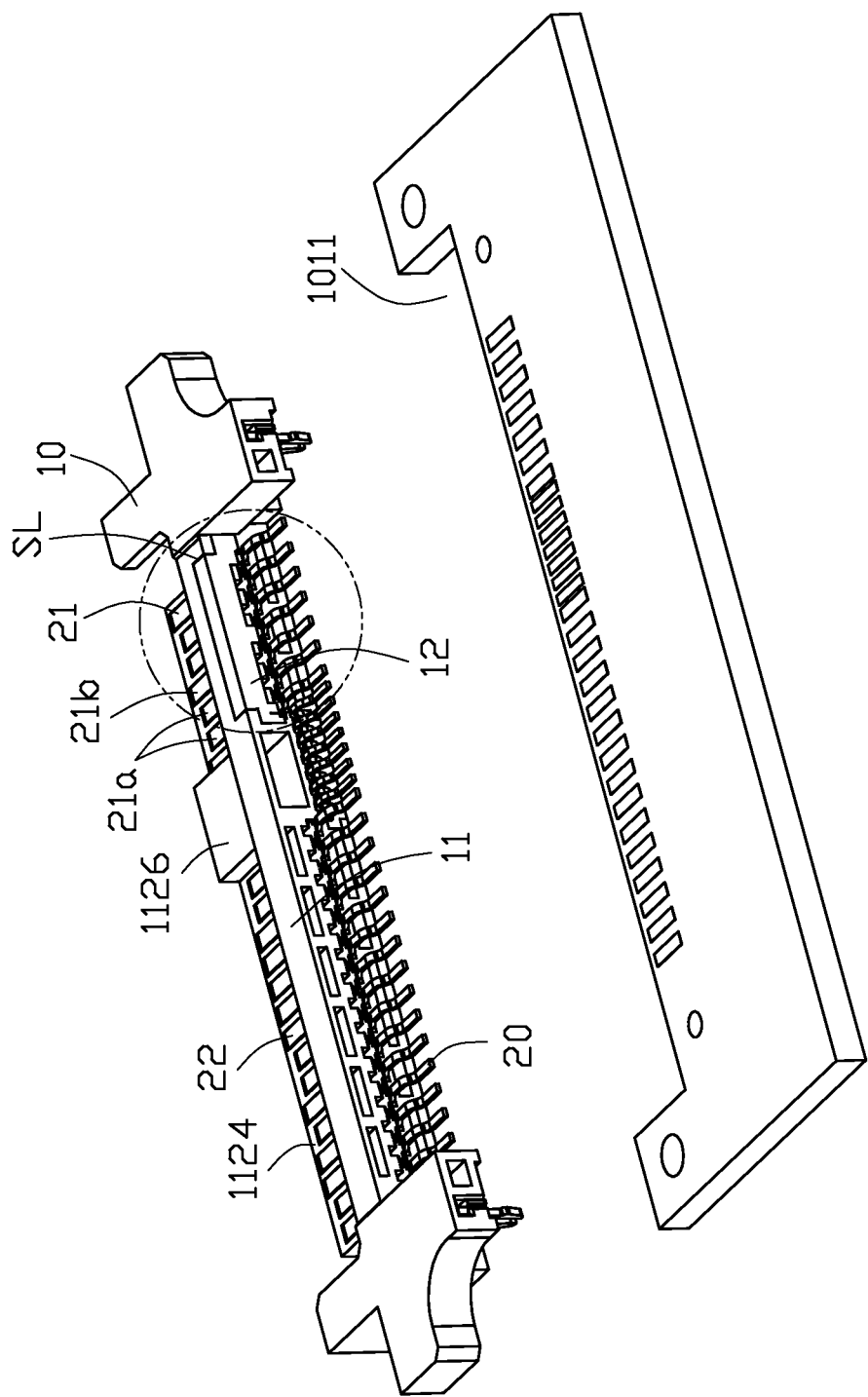
FIG. 2 is an exploded view of the electrical connector shown in FIG. 1.
Figure 3:
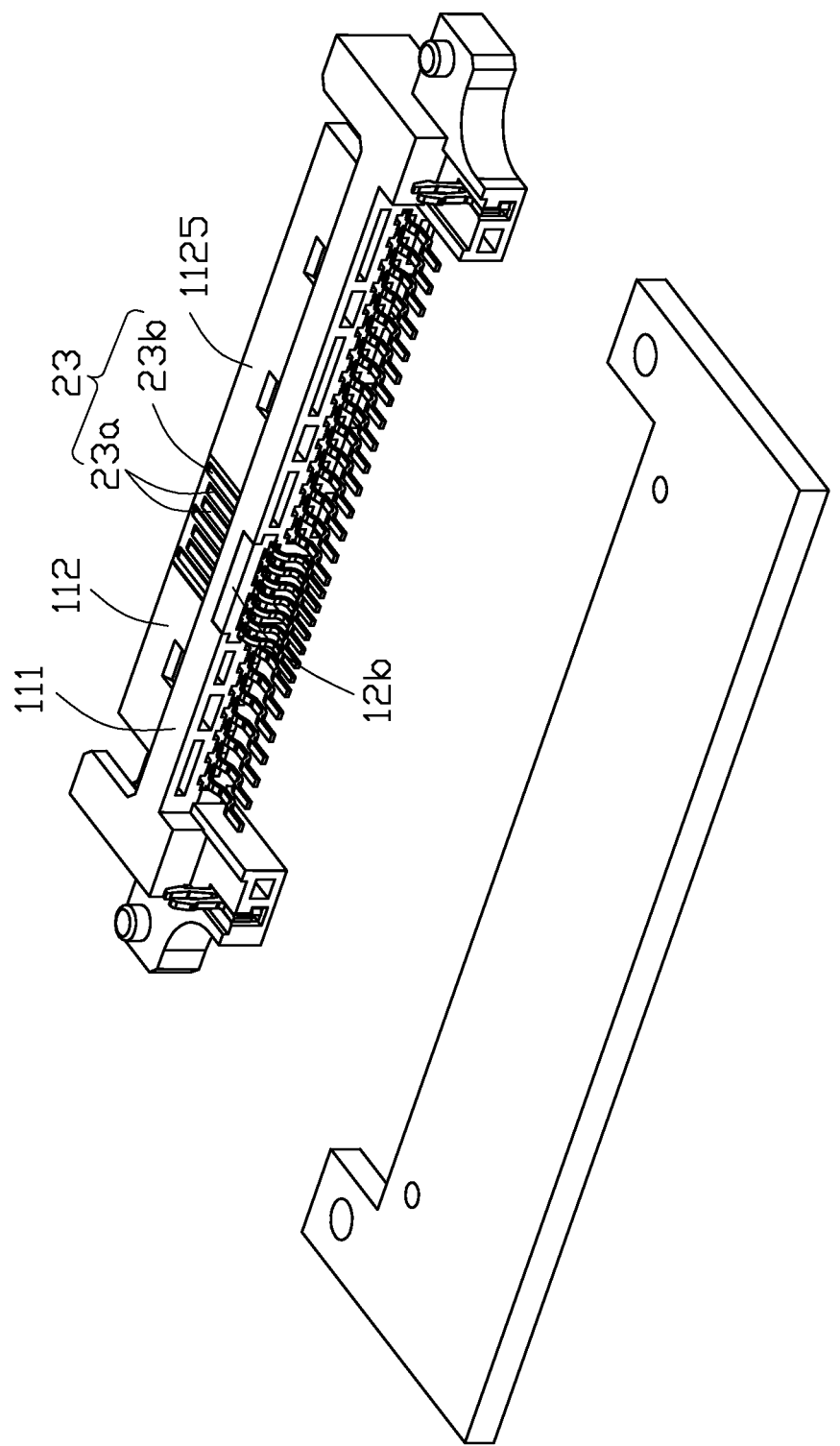
FIG. 3 is a perspective view in another direction of the electrical connector shown in FIG. 2.

According to the present invention, an electrical connector is provided to be used in a high-frequency signal transmission, and the electrical connector could be a board connector or a cable connector. Referring to FIGS. 1-3, the present aspect of the invention shows an electrical connector 100 retains in a notch 1011 of a mating electrical card 101, that is, the electrical connector and the mating electrical card form a sinking type structure. The electrical connector 100 includes terminal base 10 and a plurality of conductive contacts 20. The conductive contacts 20 define a first group of contacts 21, and the first group of contacts includes a set of signal contacts 21a and a set of grounding contacts 21b arranged with the signal contacts at intervals. The terminal base 10 includes an insulative housing 11 and a conductive plastic block 12 integrally molded with the insulative housing 11 and combine with the insulative housing 11 seamlessly, the conductive plastic block 12 electrically contacts with the grounding contacts 21b to electrically connect the grounding contacts 21b together. The insulative housing 11 and the conductive plastic block 12 is made by twice-step injection molding, and the line SL shown in FIG. 2 between the insulative housing 11 and the conductive plastic block 12 is for distinguishing the positional relationship thereof. However the electrical connector 100 does not have the line SL only if the conductive plastic block 12 and the insulative housing 11 made in different colors, and the line SL is defined as a dividing line. Due to different materials, the insulative housing 11 and the conductive plastic block 12 have different endurance, and when it applies a large force between the two parts by a tool, the two parts could separate from each other along the line SL. The seamless state between the insulative housing 11 and the conductive plastic block 12 could avoid any loose therebetween, that could make the terminal base 10 to be steadier.

Figure 4:
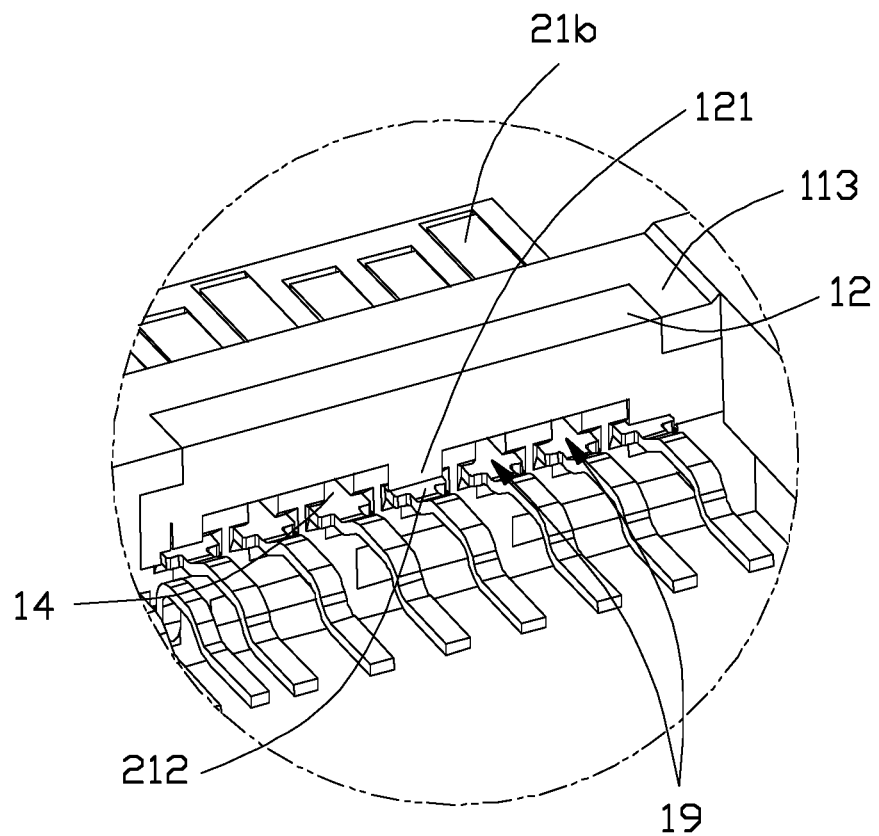
FIG. 4 is an enlarged view of the circle shown in FIG. 2.
Figure 4A:
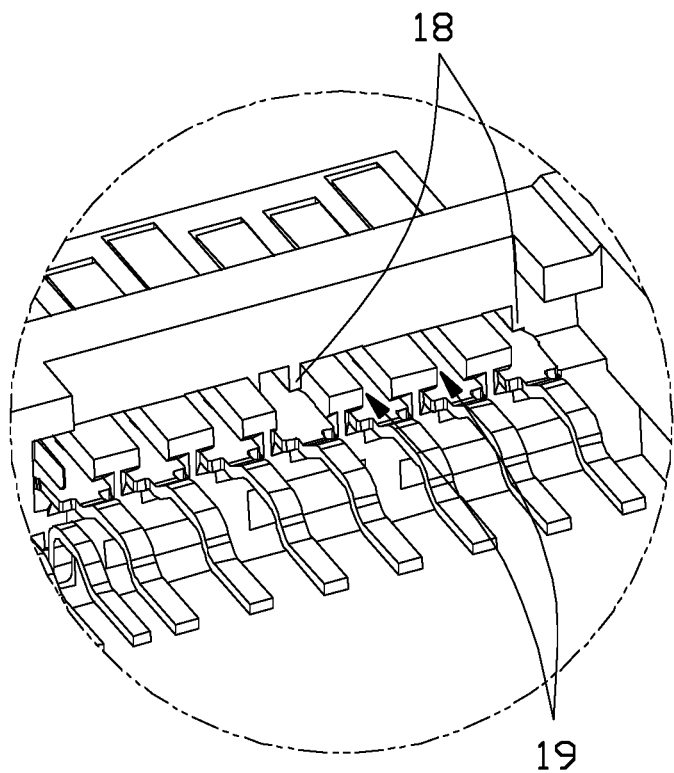
FIG. 4(A) is the enlarged portion as shown in FIG. 4 without the corresponding conductive plastic block thereof.
Figure 5:
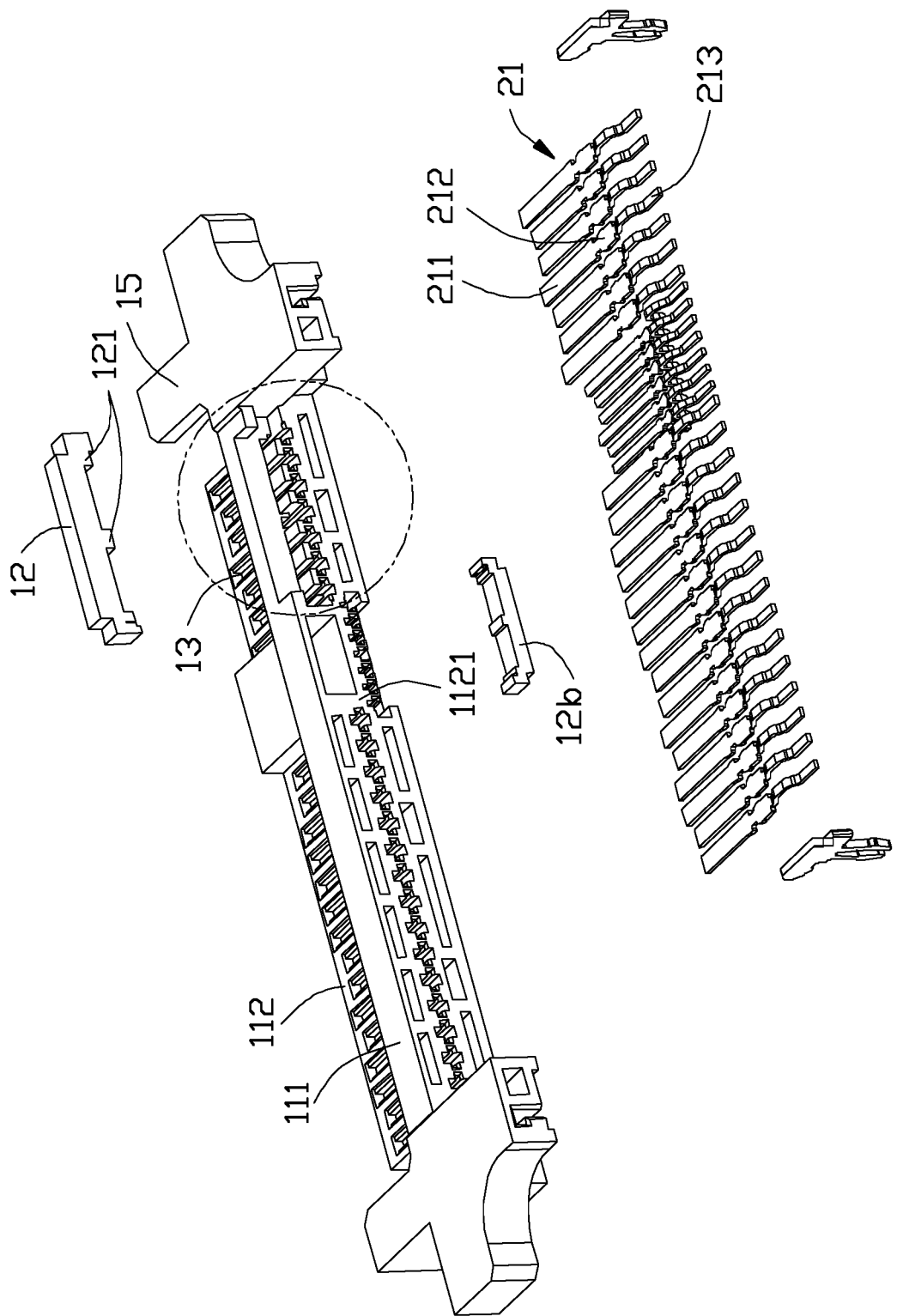
FIG. 5 is an exploded view of the electrical connector shown in FIG. 4.
Figure 5A:
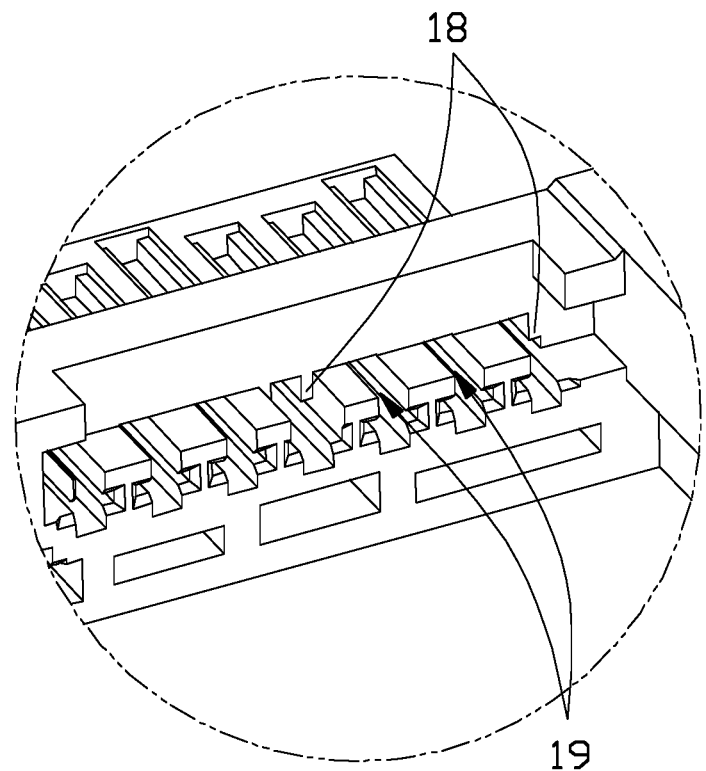
FIG. 5(A) is a partial enlarged view of the circled portion of the electrical connector shown in FIG. 5.

Referring to FIG. 5 (the explode view of the electrical connector shows every parts separately for a clear understanding about the electrical connector, but the conductive plastic block 12 and the main portion 111 is inseparable actually), and in the present aspect of the invention, the insulative housing 11 includes a main portion 111 and a tongue plate 112 extending forwardly from the main portion 111 and a pair of guide arms 15 on both sides of the tongue plate 112 and extending forwardly from the main portion 111. The guide arms 15 are spaced from the tongue plate 112. The tongue plate 112 defines a plurality of slots 13 for receiving the conductive contacts 20, and the slots 13 pass backwards through the rear surface of the main portion 111. The said slots 13 are formed after the insulative housing 11 and the conductive plastic block 12 are molded, and then the first group of contacts 21 is inserted from rear surface into the slots 13. Each of the first group of contacts 21 include a contact portion 211 located in the tongue plate 112, a retaining portion 212 retained in the main portion 111 and a soldering tail 213 extending through the rear surface 1121 of the main portion 111. The contact portion 211 and the retaining portion 212 are planar-shaped. Referring to FIG. 4, the main portion 111 defines a groove 14 communicating with the slots and corresponding to the retaining portions 212 of the signal contacts 21a. And corresponding to the retaining portions 212 of the grounding contacts 21b, the conductive plastic block defines several protruding portions 121 protruding into the groove 14 and electrically resisting the retaining portions 212 of the grounding contacts 21b. In the present aspect of the invention, the conductive plastic block 12 is set in the main portion 111 and resists the retaining portions 212 of the all grounding contacts 21b. The slots 13 present as a ladder-shape, one surface of the conductive plastic block 12 is flush with the tongue plate 112, and the other surface of the conductive plastic block forms a space from the insulative housing. In other aspects of the invention, the conductive plastic block could be set in a different area of the insulative housing, such as set in the tongue plate 112.

Referring to FIG. 4, the main portion 111 of the insulative housing 11 defines a side surface 113 parallel with the tongue plate 112. The conductive plastic block 12 is flush with the side surface 113 of the main portion 111, and the conductive plastic block 12 is also flush with the back surface 1121 of the main portion 111. In the process of forming the terminal base 10, the conductive plastic block 12 and the insulative housing 11 are integrated-molded. And the side surface 113 or the back surface 1121 of the conductive plastic block 12 forms at least an injection port (not shown in the figure) for molding, and the injection port is formed by an injection device after injection. Finally, when the terminal base is formed and the molds are removed, the conductive plastic block 12 and the insulative housing 11 are integrated.

Referring to FIGS. 2-3, the tongue plate 112 defines a first surface 1124 and a relative second surface 1125. The first surface 1124 has a convex rib 1126 separating the first surface into two parts, and the first group of contacts 21 is arranged in one part of the first surface. The conductive contacts 20 above mentioned define a second group of contacts 22 arranged in another part of the first surface and a third group of contacts 23 arranged in the second surface. The third group of contacts 23 includes a set of signal contacts 23a and a set of grounding contacts 23b arranged with the signal contacts 23a at intervals. The terminal base 10 comprises another conductive plastic block 12b integrally molded with the insulative housing and combining with the insulative housing seamlessly, the another conductive plastic block electrically contacts with the grounding contacts 23b of the third group of contacts to electrically connect them together. The conductive plastic block 12b is formed as the conductive plastic block 12, and the conductive plastic block 12b is flush with the side surface and the back surface of the main portion 111. As the foregoing description, the detail and the processing of another conductive plastic block 12b is similar as that of the conductive plastic block 12 mentioned above, so that there is no longer a detail description hereafter. Referring to FIGS. 4, 4(A), 5 and 5(A), it is further noted that in the terminal base 10, the insulative housing 11 and the conductive plastic block 12 commonly form a plurality of channels 19 located above and aligned with retaining portions 212 of the corresponding conductive contacts 20, respectively, in a vertical direction perpendicular to both the lengthwise direction and the front-to-back direction, the conductive plastic block 12 directly faces the channels in the vertical direction, and the channels extend rearwardly through a rear said of the terminal base in the front-to-back direction. Moreover, the housing 11 forms a plurality of protrusions 18 located intimately in front of the conductive plastic block 12 to cooperate with the conductive plastic block 12 to commonly downwardly abut against the corresponding same grounding contacts 21b, respectively.

Figure 6:
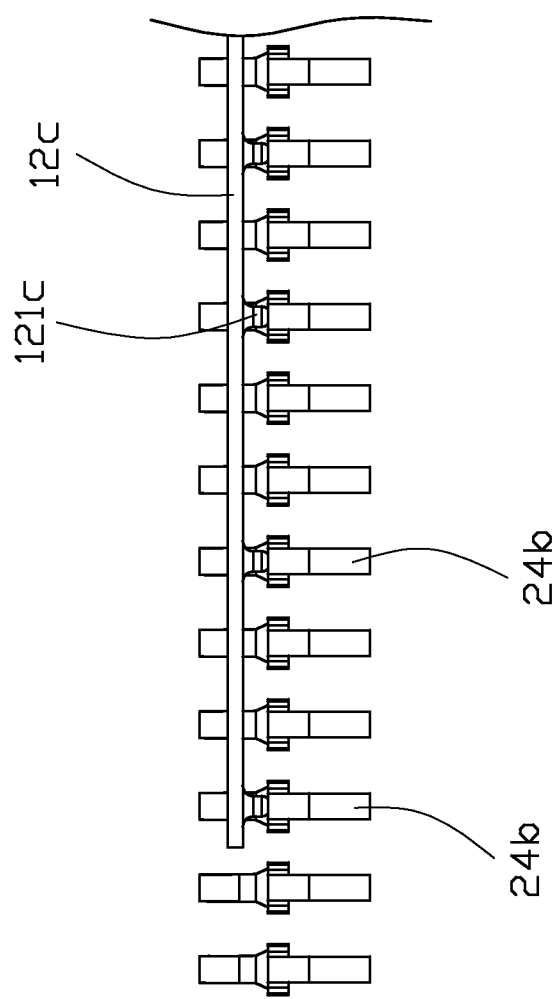
FIG. 6 is a partly view of a group of contacts according to another aspect of the present invention.
Figure 7:
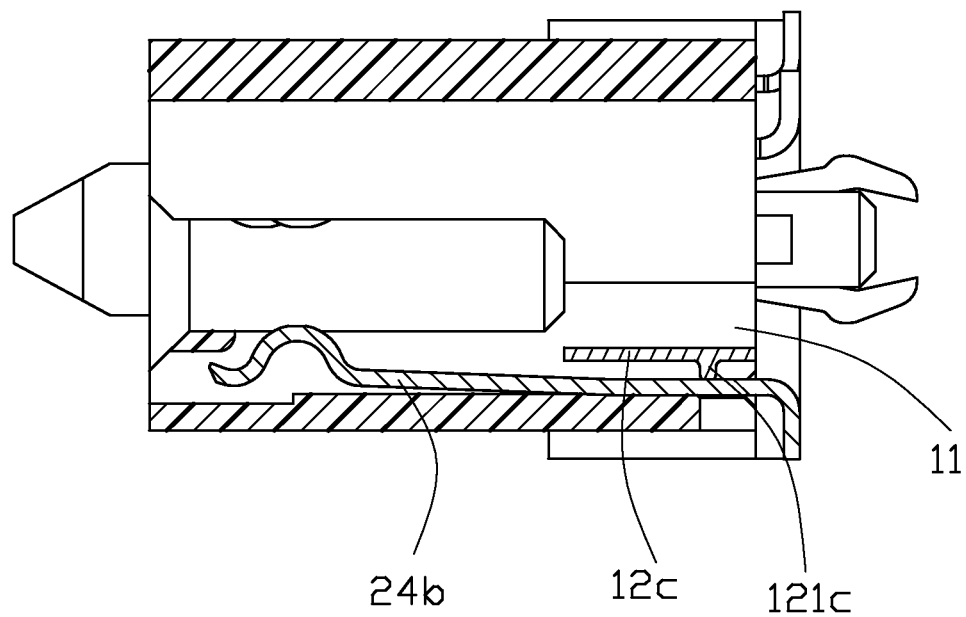
FIG. 7 is a section view of the contacts shown in FIG. 6 assembled in an insulative housing.

Referring to FIGS. 6-7, as another aspect of the present invention, the conductive plastic block could be replaced as a metal part 12c. The metal part 12c is retained in the insulative housing 11 and the metal part 12c defines a set of protruding portion 121c protruding forwards the grounding contacts 24b and resisting the grounding contacts 24b to electrically connect them together.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the board general meaning of the terms in which the appended claims are expressed.

What is claimed is:

1. An electrical connector comprising:
    a terminal base;
    a plurality of conductive contacts retained in the terminal base, the conductive contacts including a first group of contacts, and the first group of contacts including a set of signal contacts and a set of grounding contacts arranged with the signal contacts at intervals;
    wherein the terminal base includes an insulative housing, and a conductive plastic block integrally molded with the insulative housing and combining with the insulative housing seamlessly, the conductive plastic block electrically contacts with the grounding contacts to electrically connect the grounding contacts together; wherein
    the insulative housing includes a main portion and a tongue plate extending forwardly from the main portion, and each of the first group of contacts include a contact portion located in the tongue plate, a retaining portion retained in the main portion and a soldering tail extending through a rear surface of the main portion, wherein the conductive plastic block is set in the main portion and abuts against the retaining portions of the all grounding contacts; wherein
    the tongue plate defines a plurality of slots, and the slots pass backwards through the rear surface of the main portion, wherein the main portion defines a groove communicating with the slots and corresponding to the retaining portions of the signal contacts, and the conductive plastic block defines several protruding portions protruding into the groove and electrically and mechanically abutting against the retaining portions of the grounding contacts.

2. The electrical connector as described in claim 1, wherein the insulative housing and the conductive plastic block is made by twice-step injection molding.

3. The electrical connector as described in claim 1, wherein the main portion of the insulative housing defines a side surface parallel with the tongue plate, wherein the conductive plastic block is flush with the side surface of the main portion, and the conductive plastic block is flush with the back surface of the main portion.

4. The electrical connector as described in claim 1, wherein the side surface or the back surface of the conductive plastic block forms at least an injection port for molding.

5. The electrical connector as described in claim 1, wherein the tongue plate defines a first surface and a relative second surface, and the first surface has a convex rib separating the first surface into two parts, wherein the first group of contacts is arranged in one of the two parts of the first surface, and the conductive contacts define a second group of contacts arranged in another part of the first surface and a third group of contacts arranged in the second surface, wherein the third group of contacts includes several signal contacts and several grounding contacts arrange with the signal contacts at intervals, and the terminal base comprises another conductive plastic block integrally molded with the insulative housing and combine with the insulative housing seamlessly, the another conductive plastic block electrically contacts with the grounding contacts of the third group of contacts to electrically connect them together.

6. The electrical connector as described in claim 5, wherein another conductive plastic block is flush with the side surface and the back surface of the main portion.

7. The electrical connector as described in claim 1, wherein the insulative housing defines a pair of guide arms on both sides of the tongue plate and extending forwardly from the main portion, and the guide arms are spaced from the tongue plate.

8. The electrical connector as described in claim 1, wherein the slots present as a ladder-shape, one surface of the conductive plastic block is flush with the tongue plate and the other surface of the conductive plastic block forms a space from the insulative housing.

9. An electrical connector comprising:
  a terminal base including an insulative housing and a conductive plastic block, said insulative housing extending along a lengthwise direction;
  a plurality of conductive contacts retained in the housing in one row along said lengthwise direction, each of said contacts extending along a front-to-back direction perpendicular to said lengthwise direction, said contact being categorized with signal contacts and grounding contacts; and
  said conductive plastic block integrally molded with the insulative housing after the insulative housing is formed, and extending along said lengthwise direction to selectively mechanically and electrically connect to the corresponding grounding contacts; wherein
  in the terminal base, the insulative housing and the conductive plastic block commonly form a plurality of channels located above and aligned with retaining portions of the corresponding conductive contacts, respectively, in a vertical direction perpendicular to both said lengthwise direction and said front-to-back direction, said conductive plastic block directly faces said channels in said vertical direction, and said channels extend rearwardly through a rear surface of the terminal base in said front-to-back direction.

10. The electrical connector as claimed in claim 9, wherein said housing is made via a first injection molding and said conductive plastic block is made a second injection molding applied upon the formed housing.

11. The electrical connector as claimed in claim 10, wherein all the contacts are retained by the housing via an insert molding process during the first injection molding, and the selected grounding contacts are retained by the conductive plastic block via another insert molding process during the second injection molding.

12. The electrical connector as claimed in claim 9, wherein said conductive plastic block respectively contacts the corresponding grounding contacts in said vertical direction.

13. The electrical connector as claimed in claim 9, wherein said conductive plastic block is located around a rear side of the housing and exposed rearwardly and upwardly to an exterior in both the front-to-back direction and a vertical direction perpendicular to both said lengthwise direction and said front-to-back direction.

14. The electrical connector as claimed in claim 9, wherein said insulative housing forms protrusions intimately located in front of the conductive plastic block in said front-to-back direction, and cooperating with said conductive plastic block to commonly downwardly press the same grounding contacts in said vertical direction, respectively.

15. A method of making an electrical connector, comprising steps of:
  injection molding an insulative housing;
  retaining a plurality of conductive contacts to the housing wherein said contacts are categorized with signal contacts and grounding contacts, each of said contacts extending along a front-to-back direction;
  injection molding a conductive plastic block upon the insulative housing so as to form a complete terminal base; wherein
  said conductive plastic block mechanically and electrically connect to the selected grounding contacts, respectively; wherein
  all the conductive contacts is retained to the insulative housing via an insert-molding process during injecting molding the insulative housing, and said selected grounding contacts are further retained to the conductive plastic block via another insert-molding process during injection molding the conductive plastic block; wherein
  the housing and the conductive plastic block commonly form a plurality of channels respectively facing the corresponding contacts in a vertical direction perpendicular to said front-to-back direction, and said channels are rearwardly exposed to an exterior in a rear surface of the terminal base and occupied by a corresponding mold during injection molding the conductive plastic block.

16. The method as claimed in claim 15, wherein said conductive block forms a top portion and a rear portion of a contour of said terminal base.

17. The method as claimed in claim 15, wherein said insulative housing forms protrusions intimately located in front of the conductive plastic block in said front-to-back direction, and cooperating with said conductive plastic block to commonly downwardly press the same grounding contacts in said vertical direction, respectively.

* * * * *